July 26, 1949.  K. POSTHUMUS ET AL  2,477,545

NEUTRALIZED HIGH-FREQUENCY AMPLIFIER

Filed May 9, 1946

INVENTORS
KLAAS POSTHUMUS
CORNELIS ADOLF GEHRELS
BY

ATTORNEY.

Patented July 26, 1949

2,477,545

UNITED STATES PATENT OFFICE 2,477,545

NEUTRALIZED HIGH-FREQUENCY AMPLIFIER

Klaas Posthumus and Cornelis Adolf Gehrels, Eindhoven, Netherlands, assignors, by mesne assignments, to Hartford National Bank and Trust Company, Hartford, Conn., as trustee Application May 9, 1946, Serial No. 668,367 In the Netherlands June 14, 1940

Section 1, Public Law 690, August 8, 1946
Patent expires June 14, 1960

3 Claims. (Cl. 179—171)

This invention relates to a neutralized high-frequency amplifier comprising two discharge tubes connected in push-pull.

With the known high-frequency amplifying circuits the neutralizing consists in that the grid and the anode of the tubes are connected crosswise to each other via neutralizing condensers, these condensers being so adjusted that the retroaction between the output circuit and the input circuit is suppressed.

This measure permits of obtaining satisfactory results, so far as the amplification of oscillations of low frequency and of comparatively low power are concerned. For comparatively high frequencies and with high-power amplifiers in which large transmitting tubes are used it proved necessary for proper neutralizing to take into account the inductances of the connecting leads present in the circuit, more particularly of the conductor connecting the cathodes together and of the conductors via which the neutralizing condensers are connected respectively to the grids of the tubes.

It has already been suggested to tune the inductances of the connecting leads to the frequency of the oscillations to be amplified by means of condensers. A disadvantage of this measure is, however, that in the case of a variation of wavelength all these adjustments have to be changed.

A measure which permits of obtaining sufficient stability for those frequencies at which the inductances of the connecting leads are not negligible is suggested in the United States patent to Posthumus, No. 1,968,260, issued July 31, 1934. This measure consists in a correct proportioning of the length of the said conductors and this in such manner that $$\frac{1}{C_{ag}} : L_n \frac{1}{C_n} = \frac{1}{C_{af}} : L_f : \frac{1}{C_{af}}$$

in which $C_{ag}$ is the anode-grid capacity
$C_{af}$ is the grid-cathode capacity
$C_n$ is the neutralizing capacity
$L_f$ is the inductance of the connecting lead for the cathodes, and
$L_n$ is the inductance of the conductors connecting the condensers to the associated grids, while also the grid circuit is connected to the centres of the inductances $L_n$.

A circuit thus proportioned permits of obtaining very good results. It has, however, the disadvantage that in normal tubes the ratio $C_{ag}:C_{af}$ is of the order of magnitude 10:1 whereas the ratio of the inductances $L_n$ and $L_f$ is in practice about 1:1. In order to equalize these ratios, it would be necessary for the inductance of one of the conductors or one of the capacities to be increased artificially, which is naturally undesirable.

According to the invention, sufficient stability is obtained by arranging for the conductors connecting the neutralizing condensers to the grids of the tubes, which hereinafter are referred to as "neutralizing conductors," and the conductor connecting the cathodes to each other, to be made as short as possible and the input circuit to be connected to such connecting points of the neutralizing conductors that the ratio of the inductance of that part of each of these conductors by which the said connecting points are connected to the associated grids, to the inductance of half the conductor between the cathodes of the tubes is equal to the ratio of the capacity between the anode and the cathode to the capacity between the cathode and the grid of a tube.

In order that the invention may be more clearly understood and readily carried into effect, it will be explained more fully by reference to the accompanying drawing in which Fig. 1 shows the known wiring-diagram of a neutralized push-pull amplifier;

Fig. 3 represents a circuit according to the invention, of which

Figure 1:
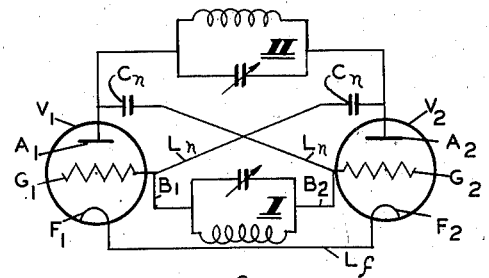

The circuit shown in Fig. 1 comprises two tubes $V_1$ and $V_2$ connected in push-pull. Between grids $G_1$ and $G_2$ is connected a tunable input circuit I and between anodes $A_1$ and $A_2$ a tunable output circuit II. The anodes $A_1$ and $A_2$ are connected respectively to the grids $G_2$ and $G_1$ via neutralizing condensers $C_n$. The two cathodes $F_1$ and $F_2$ are connected together by a conductor.

For clearness' sake the various sources of supply are omitted.

Figure 2:
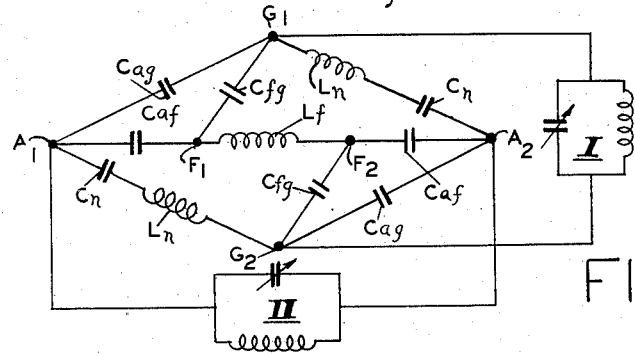
Fig. 2 shows the substitution diagram of the circuit shown in Fig. 1.

The bridge diagram shown in Fig. 2 may be substituted for the diagram according to Fig. 1. In this diagram, between the points $A_1$ and $G_1$ are shown the anode-grid capacities $C_{ag}$, between the points $A_1$ and $F_1$ and $A_2$ and $F_2$ respectively the anode-cathode capacities $C_{af}$ and between the points $F_1$ and $G_1$ and $F_2$ and $G_2$ respectively the grid-cathode capacities $C_{fg}$. It further shows the two neutralizing condensers $C_n$ and also the inductances $L_n$ of the two neutralizing conductors and the inductance $L_f$ of the conductor connecting the cathodes $F_1$ and $F_2$ together. It has been assumed that use is made of high-power transmitting tubes in which the anodes are directly accessible and that consequently the conductors connecting the neutralizing condensers to the anodes are so small as to be negligible. The input circuit I is connected via conductors $B_1$ and $B_2$ between the grids $G_1$ and $G_2$ and the output circuit II between the anodes $A_1$ and $A_2$.

According to the above-mentioned patent specification, the circuit described permits of obtaining sufficient stability if care is taken that a voltage set up across the output circuit II does not bring about an alternating voltage neither between $G_1$ and $F_1$ and $G_2$ and $F_2$ respectively, nor across the circuit I. This condition is fulfilled for all frequencies if $$\frac{1}{C_{ag}}:L_n:\frac{1}{C_n}=\frac{1}{C_{af}}:L_f:\frac{1}{C_{af}}$$

and also the circuit I is connected between the centres of the inductances $L_m$.

Since in practice it is difficult to satisfy this condition, the conductors $L_n$ and $L_f$ according to the invention are made as short as possible and the neutralizing condenser is so adjusted that $$\frac{1}{\omega C_{ag}}:\left(\omega L_n-\frac{1}{\omega C_n}\right)=\frac{1}{\omega C_{af}}:\left(\omega L_f-\frac{1}{\omega C_{af}}\right)$$

If this condition is satisfied for the frequency of the oscillations to be amplified it is ensured that a voltage across the circuit II does not bring about a voltage between $G_1$ and $F_1$ and $G_2$ and $F_2$ respectively.

Figure 3:
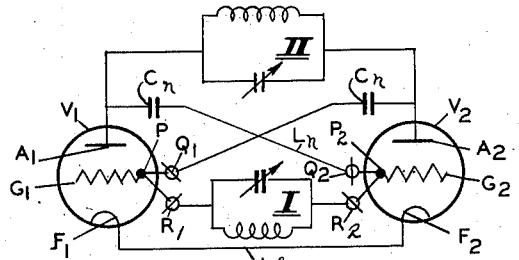
Figure 4:
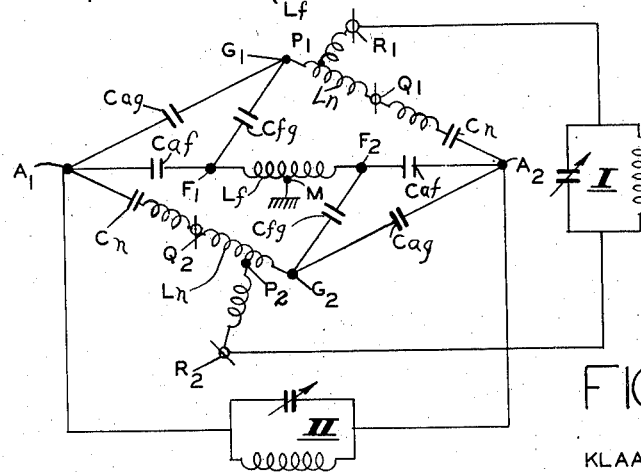
Fig. 4 shows the substitution diagram.

Furthermore, according to the invention the input circuit I is connected at points $P_1$ and $P_2$ to the neutralizing conductors, as is shown in Fig. 3, point $P_1$ being so chosen that $$L_{G_1}P_1:\frac{1}{2}L_f=\frac{1}{C_{ag}}:\frac{1}{C_{af}}$$

in which $L_{G_1}P_1$ represents the inductance of the part of the neutralizing conductor between the grid $G_1$ and the point $P_1$. Due to this choice of the point $P_1$ it is ensured for all frequencies that a voltage across the circuit II does not bring about a voltage between the points $P_1$ and M, the point M being assumed to be in the centre of the conductor $F_1$—$F_2$.

The choice of the point $P_2$ is determined by the equation $$L_{G_2}P_2:\frac{1}{2}L_f=\frac{1}{C_{ag}}:\frac{1}{C_{af}}$$

With this choice of $P_2$ a voltage between the points $P_2$ and M does not occur.

The above-stated manner of connecting the circuit I at the points $P_1$ and $P_2$ consequently results in that a voltage across the circuit II does not bring about a voltage between the points $P_1$ and $P_2$.

The choice of the point M in the centre of the conductor $F_1$—$F_2$ for the determination of the points $P_1$ and $P_2$ has the advantage that the circuit remains symmetrical. However, it is alternatively possible to assume the point M not to be in the centre of the conductor $F_1$—$F_2$; in this case the equation for the point $P_2$ is, however, no longer identical to that for the point $P_1$.

Since in the practical execution of the circuit according to the invention the inductance of the electrode leads, that is to say of the wires connecting the electrodes to the tube terminals, constitutes an important part of the inductance of the neutralizing conductors and of the conductor connecting the cathodes, use is preferably made for each of the tubes $V_1$ and $V_2$ of a discharge tube in which the control grid is provided with two terminals $Q_1$, $Q_2$ and $R_1$, $R_2$ respectively, of which one of the terminals, for example $Q_1$, $Q_2$, is connected to the neutralizing condenser $C_n$ and the other terminal $R_1$, $R_2$ to the input circuit I. According to the invention, the common parts $G_1P_1$ and $G_2P_2$ respectively of the two leads $G_1Q_1$, $G_1R_1$ and $G_2Q_2$, $G_2R_2$ respectively are so proportioned that the ratio of the inductance of those parts to the inductance of the lead of the cathode corresponds to the ratio of the capacity between the anode and the cathode to the capacity between the anode and the grid of the tube. Consequently, with the use of two tubes, of which the leads of the electrodes are thus proportioned, a stable operation is obtained, without further measures being necessary, by connecting the neutralizing condensers and the input circuit to different grid terminals and adjusting the neutralizing condenser at the correct value.

What we claim is:

1. A neutralized high-frequency amplifier comprising a pair of electron discharge tubes each provided with a cathode, a grid and an anode, push-pull input and output circuits therefor, connections from a grid of each tube to the anode of the other tube, said connections including neutralizing condensers, a conductor interconnecting the cathodes of said tubes, said connections and said conductor having appreciable inductance at high-frequencies, and means connecting the input circuit from a point on one of said connections to a point on the other of said connections, each point being at a position at which the ratio of the inductance of the portion of the connection between the grid and the input circuit to the inductance of half of the conductor between the cathodes is substantially equal to the ratio of the capacity between the anode and cathode to the capacity between the anode and grid of a tube.

2. A neutralized high-frequency amplifier comprising a pair of electron discharge tubes each provided with a cathode, a grid and an anode, push-pull input and output circuits therefor, connections from a grid of each tube to the anode of the other tube, said connections including neutralizing condensers, a conductor interconnecting the cathodes of said tubes, said connections and said conductor having appreciable inductance at high-frequencies, the inductances of said connections being substantially equal, and means connecting the input circuit from a point on one of said connections to a corresponding point on the other of said connections, each point being at a position at which the ratio of the inductance of the portion of the connection between the grid and the input circuit to the inductance of half of the conductor interconnecting the cathodes is equal to the ratio of the capacity between the anode and cathode to the capacity between the anode and grid of a tube.

3. A neutralized high-frequency amplifier comprising a pair of electron discharge tubes each including cathode, grid and anode electrodes, a cathode terminal, a lead connecting said cathode terminal to said cathode electrode, two grid terminals, a common grid lead and separate leads connecting said two grid terminals through said common lead to said grid electrode, said leads having appreciable inductance at high-frequencies, the ratio of inductance of said common lead of said grid electrode to the lead of said cathode electrode corresponding to the ratio of the capacity between the anode electrode and the cathode electrode to the capacity between the anode electrode and the grid electrode of the tube, push-pull input and output circuits for said tubes, connections from one terminal of a grid electrode of each tube to the anode electrode of the other tube, said connections including neutralizing condensers, a conductor interconnecting the cathode terminals of said tubes, said connections and said conductor having appreciable inductance at high-frequencies, and means connecting the input circuit between the other terminals of the grid electrodes of said tubes.

KLAAS POSTHUMUS.
CORNELIS ADOLF GEHRELS.

REFERENCES CITED

The following references are of record in the file of this patent:

UNITED STATES PATENTS

| Number | Name | Date |
|---|---|---|
| 1,968,260 | Posthumus | July 31, 1934 |
| 1,988,487 | Green | Jan. 22, 1935 |
| 2,013,098 | Hansell | Sept. 3, 1935 |

FOREIGN PATENTS

| Number | Country | Date |
|---|---|---|
| 552,650 | Great Britain | Apr. 19, 1943 |